United States Patent
Rood

[19]

[11] Patent Number: 6,062,864

[45] Date of Patent: May 16, 2000

[54] MATH SKILLS GAME

[76] Inventor: Beverly E. Rood, 3710 W. 84$^{th}$ Ave., Apt. 64, Westminster, Colo. 80030

[21] Appl. No.: 09/220,564

[22] Filed: Dec. 23, 1998

Related U.S. Application Data

[60] Provisional application No. 60/068,847, Dec. 29, 1997.

[51] Int. Cl.$^7$ .................................................. G09B 19/02
[52] U.S. Cl. ........................ 434/191; 434/129; 434/188
[58] Field of Search ............................... 434/72, 74, 81, 434/83, 128, 129, 188, 204, 366, 406

[56] References Cited

U.S. PATENT DOCUMENTS

| | | | |
|---|---|---|---|
| 1,009,018 | 11/1911 | Braine | 434/129 X |
| 1,514,270 | 11/1924 | Thomson | 434/188 |
| 2,875,531 | 3/1959 | Mansfield | 434/333 X |
| 3,290,798 | 12/1966 | Gilbert | 434/191 |
| 3,745,675 | 7/1973 | Jimenez | 434/188 X |
| 4,422,642 | 12/1983 | Fletcher | 434/170 X |
| 5,149,098 | 9/1992 | Bianchi | 434/406 X |
| 5,213,507 | 5/1993 | Ozrovitz | 434/406 X |
| 5,296,845 | 3/1994 | Haller | 434/406 X |
| 5,362,054 | 11/1994 | Ashemimry | 434/368 X |
| 5,575,658 | 11/1996 | Barnard | 434/406 X |
| 5,743,741 | 4/1998 | Fife | 434/406 X |

*Primary Examiner*—Sam Rimell
*Attorney, Agent, or Firm*—Haugen Law Firm PLLP

[57] ABSTRACT

The present invention is a mathematical skills game that uses a self-correcting method to enable self-learning of basic math skills. A board or other medium includes several card receiving members for receiving a card therein. A mathematical expression or a number is printed on a plurality of cards. Likewise a number or mathematical expression is associated with each card receiving member. The user determines which card matches the mathematical expression or number associated with the card receiving member. A pattern may be printed on both the medium and cards so that when the card is placed in the proper recessed area, the pattern on the card is in alignment with the pattern on the medium. If the pattern on the card does not align with the pattern on the medium, the user is then able to determine that the card has not been placed in the proper recessed area and may take the steps necessary to correct the error. An alternative embodiment includes card receiving pockets. The pockets can hold more than one card.

18 Claims, 4 Drawing Sheets

MATH SKILLS GAME

This application claims benefit of Provisional Application Ser. No. 60/068,847 filed Dec. 29, 1997.

BACKGROUND OF THE INVENTION

I. Field of the Invention

The present invention relates to a system of teaching basic mathematical operations and facts and more particularly relates to a system and apparatus for independent learning of basic math skills in progressive phases and levels.

II. Discussion of the Related Art

Learning should be a lifelong, exciting experience that opens new opportunities for a person as new insights and skills are acquired. However, certain topics or subjects such as mathematics has the reputation of being hard and difficult to learn. If learning is not made exciting or attractive at an early age, a person may continue to associate negatively with learning and with perceived difficult subjects such as mathematics.

Flash cards are one of the most basic tools used by those learning mathematical fundamentals. The mathematical question is on one side of the card, with the answer on the other side of the card. The cards can be used in a random order to test the person's skill. However, the use of flash cards assumes that the person has a basic knowledge of mathematical fundamentals. Furthermore, the random use of the cards will not create a comprehensive overview of the particular skills being acquired or the interrelationship of the numbers and operations studied.

A variety of approaches beyond rote memorization and repetitive flash cards have been taken to assist in teaching math skills. With board games, such as that shown on U.S. Pat. No. 5,782,473, the student undertakes a variety of situations in which they must utilize already acquired mathematical skills. Another approach is in the form of jigsaw puzzles such as that shown in U.S. Pat. No. 5,743,741. Again, this requires knowledge of fundamental mathematical skills. Although such games reinforce known skills, they do not teach the basics or provide progressive learning for skills building.

Worksheets are another traditional common method for teaching mathematical fundamentals. However, worksheets are limited in use and provide no opportunity for the student to determine if the answer is correct while in the process of completing the worksheet. Thus, the student is not able to re-do the original worksheet and determine where his/her weaknesses are with respect to the tasks on the original worksheet.

Hence, there is a need for a fun, progressive method of teaching mathematical basics for individuals, wherein the method is self-correcting and self-teaching. There is a further need for a re-usable, interactive method of teaching math basics that increases in skill level and teaches the student to perceive the inter-relationship between different mathematical expressions which result in the same answer. The present invention addresses these and other needs.

SUMMARY OF THE INVENTION

The purpose of the present invention is to provide a mathematical teaching tool and teaching method which provide for progressive skill levels. The first embodiment comprises a medium, such as a board, containing a series of card receiving members or recesses, each adapted for receiving a card. A series of numbers are printed on the board, each number adjacent a particular recess. Each card has a mathematical expression printed on it. Those skilled in the art will appreciate that alternatively a mathematical expression may be printed or otherwise associated with each recess and a number or combination of numbers may be printed or otherwise associated with each card. For discussion purposes, and without limitation, cards having a mathematical expression associated therewith and card receiving members having numbers associated therewith will be described hereinafter for the various embodiments of the present invention. In use, the student selects a card, determines the answer to the mathematical expression printed on the card, finds the recess having a number corresponding to the answer and places the card in the selected recess.

Additionally, a pattern may be printed on the board and cards. When the cards are inserted in the appropriate recess, the pattern adjacent each card aligns with the pattern adjacent each recess is consistent throughout the board. If a card is placed in the wrong recess, the patterns do not align. The presence of an inconsistent pattern alerts the student that the cards are not in the proper place. Thus, the student can determine which cards disrupt the pattern and rework the board and cards until all cards are in their proper location and a consistent pattern is obtained. Additionally, the board and cards may be coated with a varnish that makes it difficult to view the pattern without tilting the board to catch the light at a particular angle revealing the pattern.

In an alternate embodiment, a sheet with a series of pockets and series of cards are used A number is printed or otherwise associated with each pocket and a mathematical expression is printed or otherwise associated with each card. Each card is sized to fit into the pockets and more than one card will fit into a pocket. In use, the student places the card into the pocket associated with the correct answer for the mathematical expression printed on the card. Since more than one card may fit into the pocket, the student is able to see the inter-relationship of different mathematical questions having the same answer. Multiple sheets of pockets may be placed in an album. Alternatively, a large sheet or mat with pockets may be used so the student may have an overall visual understanding of numbers and their relationships with the various mathematical equations or expressions.

BRIEF DESCRIPTION OF THE DRAWINGS

The foregoing features of the invention will become more readily apparent by referring to the following detailed description of the preferred embodiment, taken in conjunction with accompanying drawings, in which.

DETAILED DESCRIPTION

Figure 1:
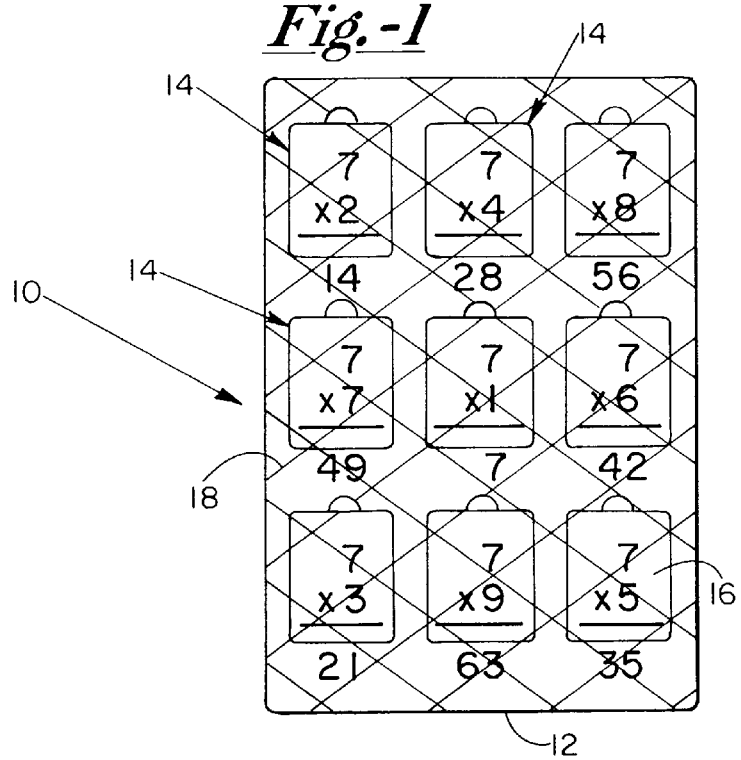
FIG. 1 is a top view of a completed board of the present invention.
Figure 2:
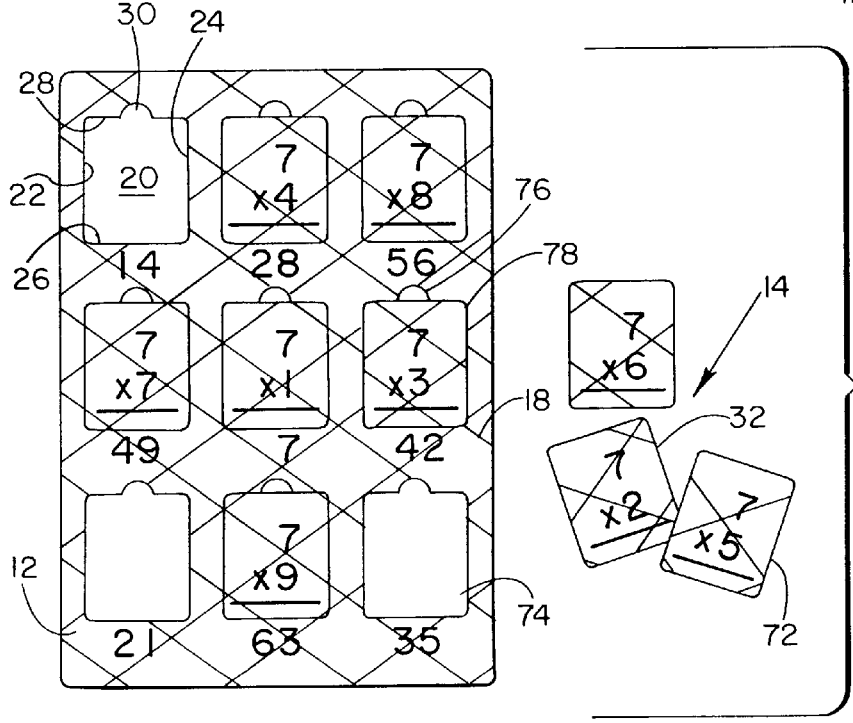
FIG. 2 is a top view of an uncompleted board of the present invention.

The present invention is a system for teaching basic mathematical skills. As seen in FIGS. 1 and 2, the system 10 consists of a board 12 with a series of removable cards 14, one of which is designated 16. A grid or any other suitable pattern 18 is printed on board 12 and the cards 14. The grid 18 is printed so that the pattern on each card is slightly offset from the other cards. As seen in FIG. 1, the multiplication of number 7 with numbers 1–9 is the mathematical subject of board 12. Only one card fits into one recessed area and a completed pattern results when all cards have been placed in the correct recessed area as seen in FIG. 1. If each card is not placed in the correct location on board, the pattern will be inconsistent, such as that shown in FIG. 2.

Board 12 is generally rectangular and sized seven and three-sixteenths inches by ten inches. Nine identically sized recessed areas, a representative one of which is designated 20 in FIG. 2, are spaced apart on board 12. Recessed area 20 has two side edges 22 and 24, a bottom edge 26 and a top edge 28. The top edge 28 includes a semicircular area 30. Recessed area 20 is sized to receive one of the removable cards 14. Each card is preferably two inches by one and three fourths inches. The semicircular area 30 assists the student in manipulating a card in and out of the recessed area 20.

Figure 3:
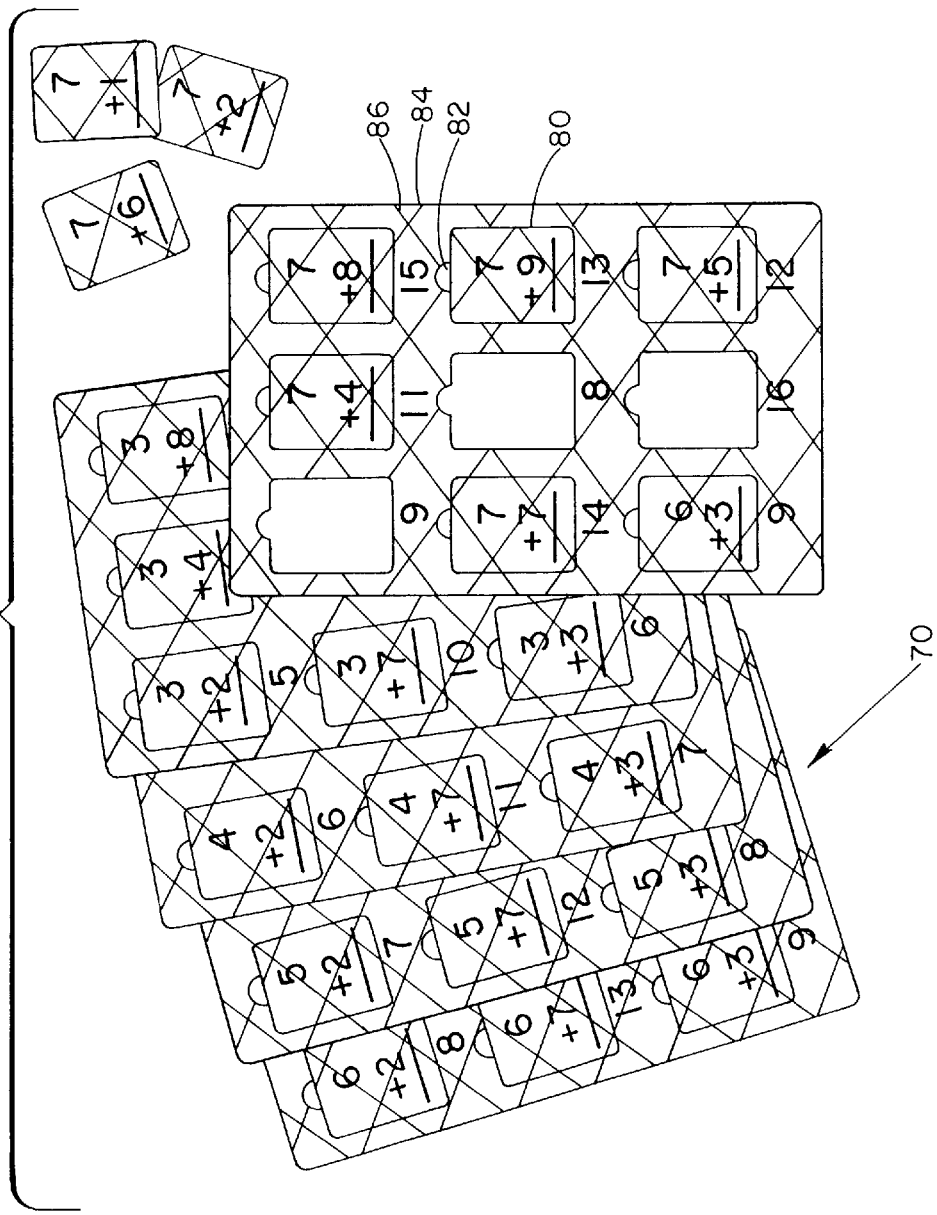
FIG. 3 is a top view of a series of boards of the present invention with one board shown uncompleted.

Each card has a mathematical expression printed on it, such as the seven times two printed on card 32 in FIG. 2. Each recessed area has a number printed adjacent its lower edge, such as the fourteen printed under recess 20 in FIG. 2. Each number printed adjacent a recess is the answer to a mathematical question printed on a card. Thus, card 32 will be placed in recessed area 20 by the student. The answers are printed on board 12 adjacent the recessed areas in random order as seen in FIGS. 1–3. The mathematical questions are not limited to multiplication. Addition, subtraction and division are all suitable mathematical subjects, as are whole numbers, fractions and decimals. Additionally, more complex subjects, such as trigonometry, are also appropriate subjects.

In use, the student selects a board, such as 12, and its cards, such as 14. Alternatively, the student can select a complete set of nine boards for the numbers 1–9 and the cards associated with all nine boards, such as the boards designated 70 in FIG. 3. The cards and corresponding boards can be color coordinated for a particular mathematical subject. This assists the younger student, since a card for one board may work in another board. The student then selects one of the cards, reviews the mathematical question and then determines which number on the board answers the question. Once a number is selected, the student places the card in the recessed area associated with the correct number. For example, if card 72 is chosen (FIG. 2), the student solves the question seven times five, finds recessed area 74 associated with the answer thirtyfive and inserts card 72 into recessed area 74. The lines of pattern 18 between card 72 and board 12 will be aligned. Thus, the student knows that card 72 is in the correct place. However, in FIG. 2, the student selected recessed area 76 for card 78 and the pattern 18 is not consistent between board 12 and card 78 as shown. Thus, the student immediately knows that the wrong answer was selected and must reevaluate the question and determine the answer. Likewise, card 80 in recessed area 82 of FIG. 3, disrupts pattern 84 on board 86.

As an additional feature, the board 12 and cards 14 may be covered with a varnish or other suitable coating to hide the pattern. That is, the pattern 18 is not visible unless board 12 is tilted at the right angle to the light in order to reveal the pattern 18. In the event that a varnish is applied, the student will not know if a card is in the correct recessed area by simply looking at the board straight on. Instead, the student must tilt the board at the proper angle to the light to determine if the pattern matches. The student may do this immediately or wait until the entire board is filled. This encourages the student to complete the board by solving the mathematical question instead of merely matching the pattern and then determine if there are any incorrectly placed cards. Thus, the board becomes self-correcting.

Preferably, nine boards are used at a time by the student, each having numbers 1–9. As stated earlier, the mathematical questions are not limited to multiplication. Initially, the student may also have a multiplication table or other answer table to assist in the initial learning of the basic facts. Once the memorization and repetition has progressed, the table will no longer be needed by the student.

Figure 4:
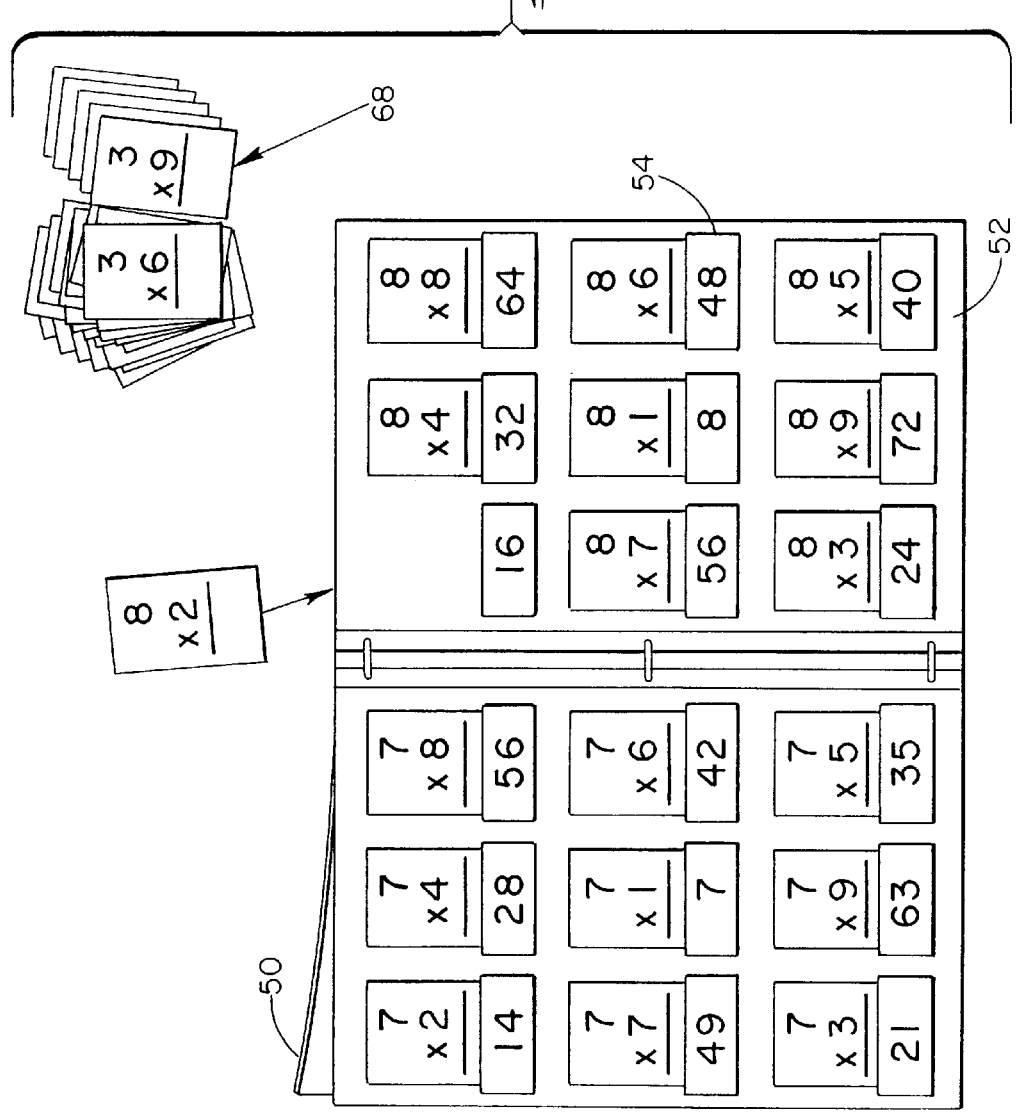
FIG. 4 is a top view of an album sheet and cards of the present invention.
Figure 5:
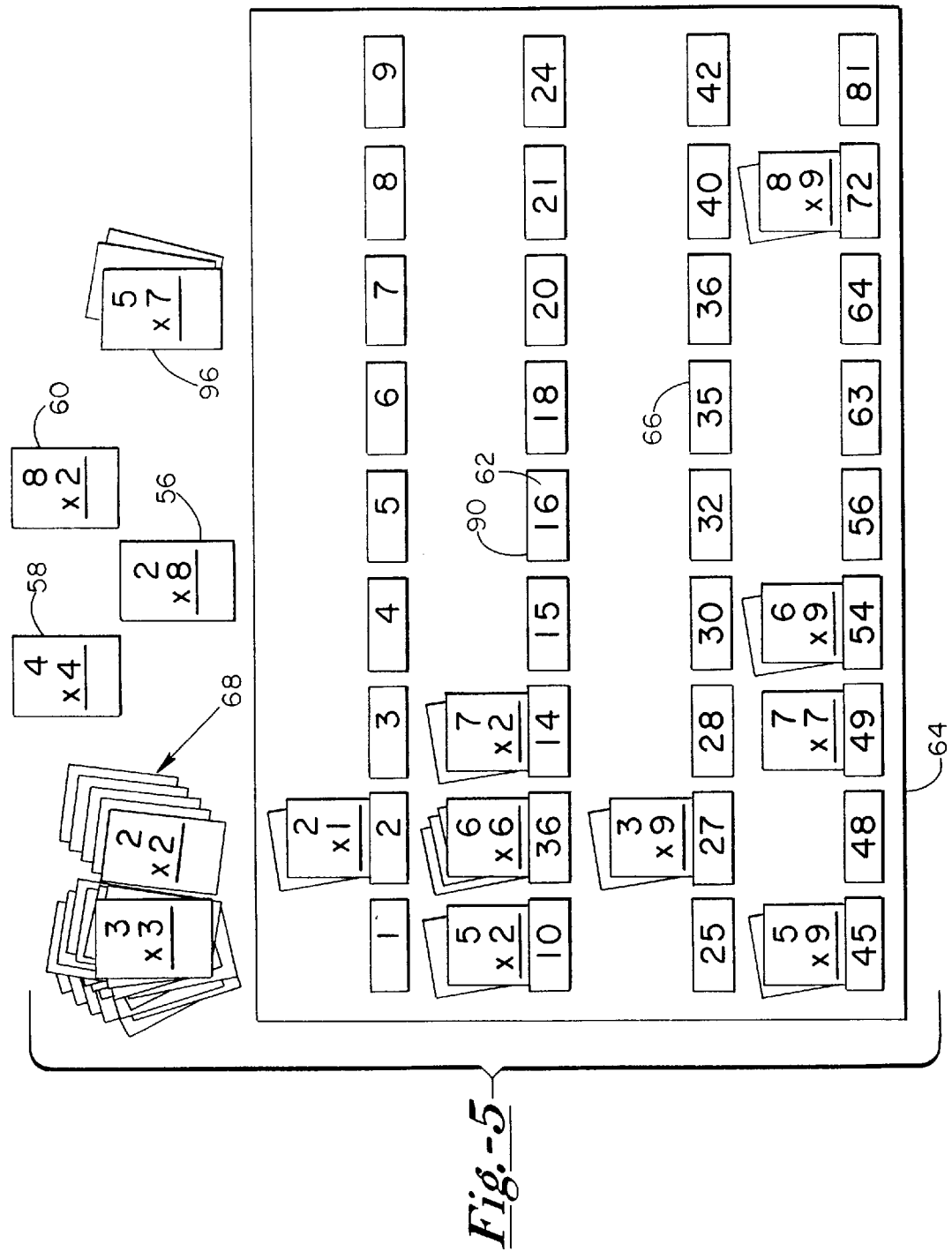
FIG. 5 is a top view of a mat and cards of the present invention.

After the student has mastered the boards or for a student with a basic understanding of mathematical fundamentals, the next step involves the use of album 50 or mat 64 shown in FIGS. 4 and 5. The embodiment of FIG. 4 is an album 50 of several sheets, one of which is shown as 52. Sheet 52 contains a series of pockets, with a representative pocket designated 54. Each pocket is identical in size and has a number printed on it, such as pocket 54 which is printed with the number forty eight. A series of cards 68 are used with album 50. Each card has a mathematical question on it in the same manner as the cards used with the first embodiment. For example, four times four is printed on card 58 and eight times two is printed on card 60.

The pockets are sized to receive one or more cards and thus cards 58 and 60 can both be inserted into pocket 62. This enables the student to see inter-relationships between different mathematical questions with the same answer, such as three times two and one times six. Album 50 can contain a series of pages that cover all numbers of basic mathematical facts, such as 1–9 and may use any appropriate mathematical subject, such as multiplication, subtraction, division and addition. Thus, a given page can be utilized in at least two ways. For example, the "8's" page shown in FIG. 4 can be utilized thusly: the user can insert one card per pocket on the "8's" page thereby conceptualizing those mathematical formulas involving eight times one through eight times nine. This utilization would mean that once card 60, eight times two, was placed in pocket 62 the page would be complete. Alternatively, the user could utilize multiple cards in a given pocket in order to conceptualize the fact that, for example, the sum of sixteen can be reached by multiplying both eight times two and four times four. This utilization would mean that both card 60, eight times two, and card 58, four times four, would be placed in pocket 62, since each formula (eight times two and four times four) equals this sum.

As an alternative to the multi sheet album 50, a large sheet 64 or mat with a series of pockets, one of which is designated 66, can be used, as seen in FIG. 5. Mat 64 contains numbers printed adjacent the pockets. These numbers are answers to the multiplication facts for the numbers one through nine that are printed on cards 68. While multiplication is shown, any other suitable mathematical subject may be used. Again, by using the enlarged mat 64, the student will see the inter-relationship between the basic multiplication tables or other mathematical operation.

Having described the constructional features of the embodiment shown in FIGS. 4 and 5, the mode of use will next be presented. The student selects a card, solves the mathematical question and places the card in the pocket printed with the answer. In this embodiment, the student may be placing more than one card in a pocket. For example, pocket 90 is printed with the number six, the answer to the mathematical questions printed on cards 58 and 60 whereas pocket 92 will only receive card 94. This enables the student to learn that there may be different ways to arrive at the same answer. The student can then self-correct with a chart or have it viewed by a teacher. Each page has different set of random numbers and the same sheets can be used with a variety of card sets covering addition, multiplication, division, subtraction and other appropriate mathematical subjects.

The use of mat 64 is the same as with the album 50, however, the mat 64 provides an overall visual representation of the various answer and ways to arrive at that answer. That is, the student selects a card, such as card 96, determines the answer is thirty five and places the card in pocket 66 printed with the answer thirty five. As explained earlier, more than one card can fit into a pocket. Thus, not only is the student reinforced by selecting the cards to determining the answer and entering them into the correct pocket, the student will also see the inter-relationship with other numbers and other mathematical questions.

This invention has been described herein in considerable detail in order to comply with the Patent Statutes and to provide those skilled in the art with the information needed to apply the novel principles and to construct and use such specialized components as required. However, it is to be understood that the invention could be carried out by specifically different equipment and devices, and that various modifications, both as to the equipment details and operating procedures, can be accomplished without departing from the scope of the invention itself

What is claimed is:

1. An apparatus for learning math skills comprising:
   (a) a medium;
   (b) a plurality of card receiving members associated with said medium, each said card receiving member having an indicia representing a resultant mathematical expression associated therewith;
   (c) a plurality of cards sized to be received in said plurality of card receiving members, each card having an indicium together with a mathematical expression associated therewith, wherein the said indicium and mathematical expression of each said card receiving member matches the corresponding one of said mathematical expression and indicium of one of said plurality of cards.

2. The apparatus as recited in claim 1, further including a pattern provided on said medium and said plurality of cards, wherein a portion of the pattern provided on each of said plurality of cards aligns with one elected and corresponding portion of the pattern provided on said medium.

3. The apparatus of claim 1, wherein said medium and said cards are coated with a varnish.

4. The apparatus of claim 1, wherein said medium is in the form of a large mat.

5. The apparatus of claim 4, wherein said card receiving members form pockets adapted for receiving the cards.

6. The apparatus of claim 1, and further including an album containing at least one medium.

7. The apparatus of claim 6, wherein said card receiving members form pockets adapted for receiving the cards.

8. The apparatus as recited in claim 1, wherein said card receiving members comprise recesses formed in said medium and are adapted for receiving said plurality of cards therein.

9. An apparatus for learning math skills comprising:
   (a) a plurality of mediums;
   (b) a plurality of card receiving members associated with each one of said mediums, each said card receiving member having an indicia representing a resultant mathematical expression associated therewith;
   (c) a plurality of cards sized to be received in said plurality of card receiving members, each card having an indicium together with a mathematical expression associated therewith, wherein the said indicium and mathematical expression of each said card receiving member matches the corresponding one of said mathematical expression and indicium of one of said plurality of cards.

10. The apparatus as recited in claim 1, further including a pattern provided on said medium and said plurality of cards, wherein a portion of the pattern provided on each of said plurality of cards aligns with one elected and corresponding portion of the pattern provided on said medium.

11. The apparatus of claim 9, wherein said plurality of mediums and said cards are coated with a varnish.

12. The apparatus of claim 9, wherein said plurality of mediums are in the form of large mats.

13. The apparatus of claim 12, wherein said card receiving members form pockets adapted for receiving the cards.

14. The apparatus of claim 9, and further including an album containing said plurality of mediums.

15. The apparatus of claim 14, wherein said card receiving members form pockets adapted for receiving the cards.

16. The apparatus as recited in claim 9, wherein said card receiving members comprise recesses formed in each of said plurality of mediums and are adapted for receiving said plurality of cards therein.

17. A method of learning math skills comprising:
   (a) selecting a medium having a plurality of card receiving members, each of said card receiving members having an indicia representing a resultant mathematical expression associated therewith;
   (b) selecting a card from a plurality of cards, each said card having an indicium together with a mathematical expression associated therewith;
   (c) matching one of said indicium and mathematical expression of said card receiving member with a certain corresponding one of said mathematical expression and indicium of said selected card;
   (d) placing said selected card in that certain matching card receiving member; and
   (e) repeating steps (b)–(d) until said plurality of cards are placed in said plurality of card receiving members.

18. The method of claim 17 and further including the step of providing a pattern on said medium and said plurality of cards, wherein a portion of the pattern provided on each of said plurality of cards aligns with a corresponding portion of the pattern provided on said medium.

* * * * *